Apr. 3, 1923.  1,450,630
J. HARRIS
GATE FASTENING DEVICE
Filed June 2, 1921
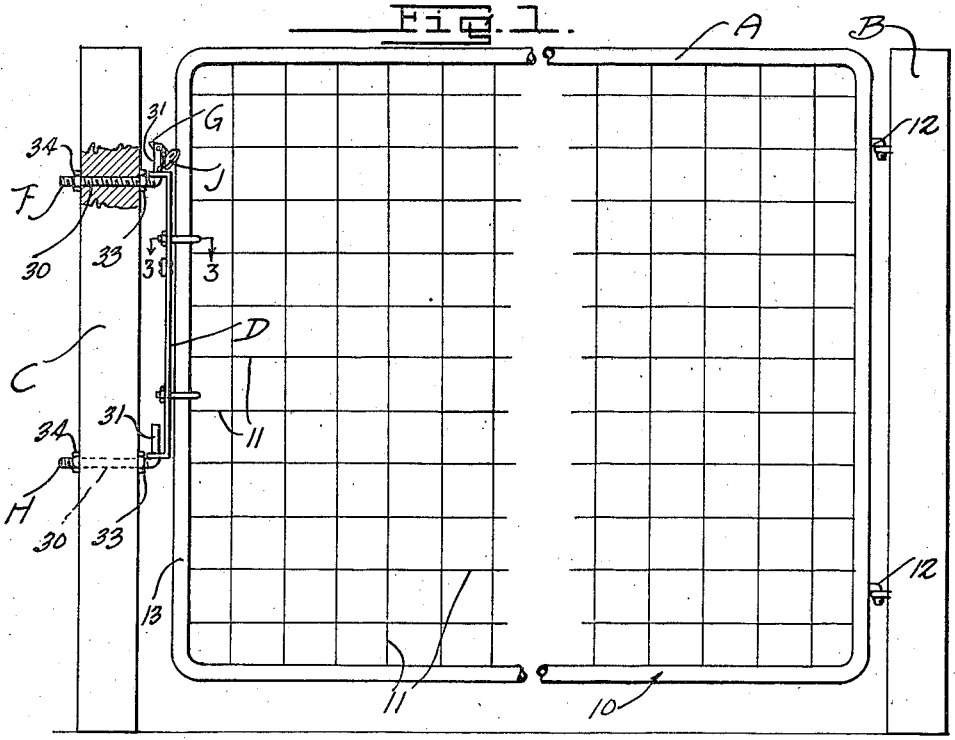
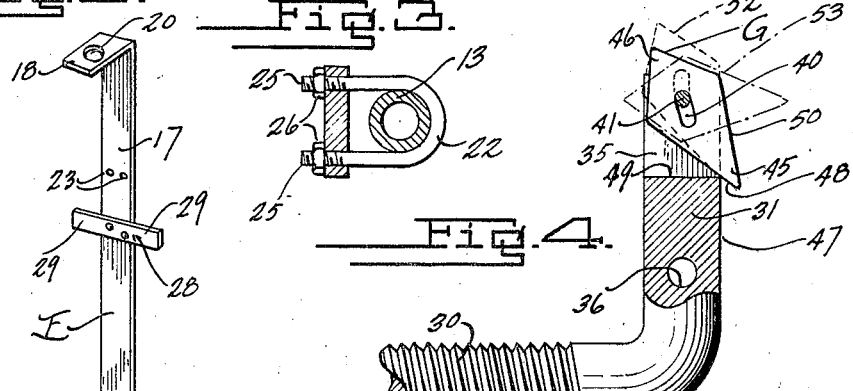
James Harris.
Inventor Patented Apr. 3, 1923.

1,450,630

UNITED STATES PATENT OFFICE.

JAMES HARRIS, OF PONOKA, ALBERTA, CANADA.

GATE-FASTENING DEVICE.

Application filed June 2, 1921. Serial No. 474,473.

*To all whom it may concern:*

Be it known that I, JAMES HARRIS, subject of the King of Great Britain, residing at Ponoka, in the Province of Alberta and Dominion of Canada, have invented certain new and useful Improvements in Gate-Fastening Devices, of which the following is a specification.

This invention relates to improvements in fastening devices for preventing accidental, or unauthorized opening of closure members, such as gates.

The primary object of the invention is the provision of a fastening device for gates, which is automatic in operation to maintain a gate in closed position against accidental opening, such as is apt to occur, as by rubbing of domestic animals thereagainst.

A further object of the invention is the provision of a fastening device of the above described character which is positive in operation including automatic locking means, requiring manual operation to release said locking means, to permit opening of the gate.

Further objects of the invention are the provision of a latch device, which is durable; one which is simple in construction; one easy to manipulate without lifting of the gate to which it is attached; and one which can be sold as an accessory for use upon gates of approved standard construction.

Other objects and advantages will be apparent during the course of the following detailed description.

In the accompanying drawing, forming a part of this specification, and in which similar reference characters designate corresponding parts throughout the several views, Figure 1 is a fragmentary front elevation of a gate, showing the improved fastening device as used therewith.

Figure 2 is a perspective view of a latch member used in connection with the improved fastening device.

Figure 3 is a cross sectional view taken on the line 3—3 of Figure 1.

Figure 4 is an enlarged fragmentary view, partly in section, of important details of the improved fastening device.

In the drawing, wherein for the purpose of illustration is shown a preferred embodiment of my invention, the letter A designates a gate hingedly connected to a post B, and having a fastening post C rigidly mounted near the free or swinging end of the gate; said free end of the gate, and said fastening post C having the improved fastening device D mounted thereon. The fastening device D preferably includes a latch member E, reciprocably disposed upon a portion of the gate A; and adapted for cooperation with a stationary supporting member F, to permit latching of the member D thereover. A latching bolt G is pivotally mounted upon the support F, for automatic operation to permit latching of the member D upon the support F, and to automatically lock the same in position against accidental removal. An auxiliary support H may be provided for cooperation with the latch member E, to rigidly latch the gate against accidental opening.

The gate A, of course, may be of any approved construction, the same preferably comprising the frame 10, having the foraminous means 11 thereon, which in the present instance are wires. The gate A, is hingedly connected at 12 in any approved manner, to a post B to permit free swinging of the gate A. The vertical portion 13 of the frame 10, which lies adjacent the post C is spaced therefrom a sufficient distance, to accommodate the latching mechanism D. The post C may be of any approved construction, such as concrete, iron, wood, or the like.

The latch member E is preferably formed of bar metal, the same comprising the flat body portion 17, provided upon the ends thereof with the outwardly projecting extensions 18 and 19; said extensions being substantially at a right angle with respect to the body 17. Suitable apertures 20 and 21, respectively, are provided in the extensions 18 and 19, for the reception of the stationary supports F and H respectively. Suitable U-shaped staples 22 are provided adjacent each of the extensions 18 and 19, and through suitable apertures 23; said staples 22 adapted to have the free ends of their legs screw threaded as at 25, for free insertion through the apertures 23. Nuts 26 are adjustably mounted upon the screw threaded ends 25, for maintaining the staple arrangement 22 in suitable position upon the body 17, of bars E. The staples 22 are adapted to be reciprocably disposed upon the vertical portion 13 of frame 10, for maintaining the latch member E for reciprocation with respect to the gate A. The upper and lower limits of movement of the latch member E are defined by certain of the wires 11, which are spaced to provide proper cooperation of the latch member E with respect to the supports F and H. When the latch member E is in its unlatched position, the staples 22 rest upon certain of the cross wires 11, for supporting said latch member. A suitable hand engaging member 28 is riveted or otherwise secured to the body 17 of the member E; and providing the extending portions 29 to facilitate lifting of the member E. The bolts F and H are preferably L-shaped in formation, provided with the relatively long screw threaded shanks 30, adapted for transverse insertion through the post C. Relatively shorter shanks 31 are provided at substantially right angles with respect to the shanks 30, and when the supports F and H are properly positioned in the post C, the shanks 31 extend upwardly in vertical alignment with the post C and spaced therefrom. In positioning the shanks 30 upon the post C, a nut 33 is threaded upon each of the shanks 30 for its entire length upon the screw threaded portion of the shank; the shank 30 of each of the members F and H are then inserted through suitable apertures in the post C, and providing a portion of each of said shanks which projects from the opposite face of said post C. A nut 34 is then positioned upon this extending portion of each of the shanks 30, and when adjusted upon said shanks 30, the nuts 34 will clamp tightly against the outer side of the post C; thus the stationary supporting members F and H will be rigidly clamped to the post C by their nuts 33 and 34. In this position, the supports F and H have their shanks 31 in vertical position.

The vertical shank 31 of the stationary support member F is provided with a recess or slot 35 extending downwardly from the top thereof, and in alignment with the axis of said shank. A suitable aperture 36 is likewise drilled transversely through the shank 31, and upwardly from the shank 30 of the member F, the purpose of said apertures 36 to be subsequently set forth.

The locking member G is of elongated diamond shaped appearance, and provided with a suitable slot 40 transversely therethrough. The locking bolt G is preferably flat, and adapted for free insertion in the slot 35 of the member F. A suitable pin 41 is transversely provided through the upstanding ends of the shank 31, and as defined by the slot 35, said pin 41 being provided for insertion through the slot 40 in the lock bolt G, whereby the lock bolt G may be oscillated or pivoted upon said pin 41. The slot 40 is so provided in the member G that one end 45 of said bolt member is heavier than its opposite end 46, said arrangement being provided for a specific purpose.

When the member G is assembled in pivoted relation within the pocket 35 of the support F, a small portion of the weighted end 45 of said member G projects outwardly from the outer side 47 of the shank 31; and by reason of the fact that a side 48 of the member G rests upon an outer edge of the bottom 49 of the slot 35. When in this position, an outer marginal edge 50 of the member G is exposed outwardly from the side 47 of the support F; said side 50, together with the side 48 converging and inclining downwardly.

In operation, the gate A being opened and upon swinging of said gate A, the extensions 18 and 19 will not contact with any portions of the supports F and H as said gate A is swung past the post C, due to the fact that the latch member E is supported by the staples 22 upon certain of the wires 11; this position assumed by the unlatched position of the member E being such, as to maintain the sections 18 and 19 below their cooperating stationary supports F and H. In order to latch the gate, the operator grasps the hand extension 29 of the latch member G, and upon raising the same the extensions 18 and 19 will be elevated above the top of the shanks 31 of members F and H. When the apertures 20 and 21 in the extensions 18 and 19 are in alignment with the shanks 31, the operator lowers the latch member E, and the shanks 31, of the members F and H, are disposed within the apertures 20 and 21 respectively.

It is preferred that the aperture 20 in the extension 18 be of just sufficient diameter to permit free reciprocation over the shank 31 of the support F. As the extension 18 is lowered over the shank 31, the sides of aperture 20 contact with the inclined outer marginal edge 50 of the lock bolt G. This contacting feature, will result in rocking of the member G upon the pivot pin 41 and forcing said member G upwardly, whereby the same is oscillated and the slot 40 moved relative on the pin 41. This position is illustrated in the dotted lines 52, illustrated in Figure 4 of the drawings, and when the lock bolt G assumes this position, the same will be enclosed within the pocket 35 of the support F, the marginal edge 50 lying flush with the outer sides 47 of the shank 31. Thus the latch member E can be lowered over the shank 31 and the bolt G will provide no obstruction of said lowering.

When the latch member E has been latched over the shank 31, the extension 18 will rest upon the horizontal shank 30 of said support F, and be maintained in this position to close the gate A. As the extension 18 rides past the latch member G said latch member G due to its weighted end 45 will drop by gravity, and oscillate into its normal position as illustrated in the full lines in Figure 4 of the drawing; rendering the position of the lock member G substantially as hereinbefore described to have a portion of said latch bolt G projecting outwardly from the outer surface 47 of the support F. Should the latch member E now be lifted, the top surface of said extension 18, of said latch member E, will first contact the extreme point of the end 45 of member G. As the latch member E is further elevated, the member G will be rocked upon its pivot pin 41 until both of the ends 45 and 46 project for a considerable distance from opposite sides of the slot 35. The latch member E can only be elevated until the diamond shaped bolt G assumes its horizontal position, substantially as illustrated in the dot and dash line 53, in Figure 4 of the drawing; and in which position, the ends 45 and 46 of said bolt G project outwardly from the slot 35. Upon the bolt G assuming this position, the ends 45 and 46 will contact with the upper surface of the extension 18 of latch member E, and prevent any further removal of the latch member E from the stationary support F.

From the foregoing it can be seen that a latch bolt has been provided, which is automatic in locking operation, and will prevent any accidental removal of the member E from its stationary support E, such as is apt to occur in the ordinary type of latching arrangement, incident to cattle rubbing thereagainst.

When a person desires to unlatch the member E, it is merely necessary for him to depress the end 45, by engagement of his finger against the extended marginal edge 50 of the bolt G. This will have the above described effect of closing the lock bolt G within the slot 35, of the shank 31, and allowing the upward elevation of the extension 18 over the lock bolt G.

As hereinbefore stated, the aperture 36 is transversely provided in the shank 31, above the horizontal shank 30. As the extension 18 rests upon the shank 30 about the shank 31, the aperture 36 will likewise lie upwardly from the top of the extension 18. A padlock J may be provided for insertion in the aperture 36 and by which arrangement the extension 18 may be locked intermediate the aperture 36, and the shank 30, to prevent unauthorized removal of the latch member E from its rigid support F.

The lower stationary support H, of course, cooperates with the support F in rigidly bracing the latch member E from any vibratory or rocking motion of said member E as the gate A is subjected to strain, as by cattle rubbing thereagainst. It is to be understood, however, that the lower support H need not be provided as an element of the improved fastening device, since very obviously the successful operation of said device can be effected by means of a single support F, acting in cooperation with the latch and lock bolt G.

Various changes in the shape, size and arrangement of parts may be made to the form of the invention herewith shown and described, without departing from the spirit of the invention or the scope of the claims.

I claim:

1. In a fastening device, the combination with a closure member, of a stationary support fixed adjacent said closure member, means on said closure member for engaging said stationary support, and gravity operated locking means pivoted on said stationary support, and having a portion thereof normally projecting from a side of said support, and foldable within said support upon placing of said first mentioned means thereover, said projecting portion of the pivoted means adapted by gravity to automatically assume its normal position for retaining said first mentioned means in locked position on the support.

2. In a fastening device, the combination with a closure member, of a support rigid with respect to said closure member having a pocket therein, a latch member movably mounted on said closure member for placing over the pocket end of said support, and an elongated locking bolt oscillatively mounted in the pocket of said support, and automatically operable to permit free movement of said latch member upon said support for locking the former on the latter.

3. In a fastening device, the combination with a closure member, of a support rigid with the closure member having a pocket therein, a latch member movably mounted on said closure member for placing over the pocket end of said support, and an elongated substantially diamond shaped locking bolt having a slot therein, said locking bolt pivotally mounted through its slot within the pocket of said support, and automatically operable to permit free movement of said latch member upon said support for locking the former on the latter.

4. In a fastening device. the combination with a closure member, of a support rigid with respect of said closure member having a pocket therein, a latch member movably mounted on said closure member for placing over the pocket end of said support, and an elongated locking bolt having a slot therein pivotally mounted through its slot within the pocket of said support, one end of said locking bolt being weighted to be gravity operated for maintaining a portion thereof normally projecting from a side of said support, whereby upon placing said latch member over said support, the latch member will contact said projecting portion of the locking bolt to swing the same pivotally into its pocket, and permitting disposal of the latch member over the support, said projecting portion automatically resuming its projecting position to prevent accidental removal of the latch member from the support.

5. In a fastening device, the combination with a gate and fastening post, of a substantially rigid support detachably mounted upon said post, having a substantially vertical portion projecting therefrom, a latch member reciprocably mounted upon said gate and having a projecting portion thereon for sliding over and embracing the vertical portion of said rigid support, and means for automatically locking said latch member on said support.

6. In a fastening device, the combination with a gate and fastening post, of a support rigid upon said post having a substantially vertical portion projecting therefrom, a latch member reciprocably mounted upon said gate having a projecting portion thereon for engagement over the vertical portion of said rigid support, and means upon the vertical portion of said support permitting free placement of said latch member thereover, and preventing accidental disconnection therefrom.

7. In a fastening device, the combination with a hinged gate, and a fastening post therefor, of a support rigid upon said post having a substantially vertical portion projecting therefrom, a latch member reciprocably mounted upon said gate having a projecting portion thereon for engaging over the vertical portion of said rigid support to latch said gate to said post, said latch member when removed from said support adapted to be positioned out of the path of contact with said vertical portion, and permitting unimpeded swinging of said gate past said fastening post.

8. In a fastening device, the combination with a gate and gate post, of a substantially L-shaped rigid support detachably mounted in said post and having a vertical shank projecting outwardly therefrom, a latch member reciprocably mounted upon a portion of said gate adjacent said rigid support, and provided with a projecting portion adapted for fitting over the vertical shank of said support, a hand engaging portion on said latch member, and a locking means on said vertical shank to permit insertion of the latch member thereover, and preventing accidental removal therefrom.

9. In a fastening device, the combination with a gate and a gate post, of a pair of substantially L-shaped supports rigidly mounted in said post, and each provided with an upwardly projecting vertical shank thereon, a latch member reciprocably disposed upon said gate adjacent said stationary supports, and provided with outwardly projecting apertured extensions adapted for engaging the vertical shank of said stationary support, and means upon one of said stationary supports for oscillation to permit insertion of the latch member thereover, and adapted for gravity operation to prevent accidental detachment of said latch member from said stationary support.

10. In a fastening device, the combination with a gate and a gate post, of a substantially L-shaped stationary support having one leg thereof screw threaded and adapted for detachable insertion through said gate post, nuts upon said screw threaded portion for retaining said stationary support in predetermined position upon said gate post, said other leg of the stationary support adapted for upwardly extending vertical position, and having a slot in the end thereof, a latch bar, means detachably mounting the latch bar to a portion of said gate, said latch bar including an apertured end adapted for free insertion over the vertical shank of said stationary support, and a gravity operated locking bolt oscillatively mounted in the slot of said stationary support to permit free insertion of said latch member over said stationary support, and preventing accidental detachment therefrom.

11. In a device of the class described, the combination with a stationary support and a closure member movable with respect to said support, of a latch member movably carried by said closure member, and a locking bolt movably carried by said support, said locking bolt being normally held in a determined position under its own weight, said latch member being adapted for engaging and embracing said support whereby the same may slide past said locking bolt to permit the latter to swing to its normal position under its own weight and out of engagement with said latch member whereby the latch member may be locked in position upon said support against liability of displacement therefrom.

12. In a device of the class described, the combination with a closure member and a support rigid with respect thereto including a projection, of a latch member movably mounted on said closure member for engaging the projection of said support, and a locking bolt movably connected to the projection of said support to normally have an end of said bolt extending outwardly from the marginal edge of the projecting portion, said latch member when moved to engage the projection of said support adapted to move the projecting end of said latch bolt inwardly of the plane, defined by said support projection, and whereby when the latch member comes to rest the same will be out of engagement with said locking bolt and against liability of displacement by reason thereof.

13. A fastening device comprising a stem, a latch member detachably slidable upon said stem, and a locking member pivotally connected to said stem for folding inwardly thereof to permit free attachment or detachment of said latch thereon, said locking member being normally free to assume a natural portion whereby a portion thereof will extend outwardly from said stem.

JAMES HARRIS.